United States Patent
Tanaka (10) Patent No.: US 10,341,624 B2
(45) Date of Patent: Jul. 2, 2019

(54) PROJECTION IMAGE DISPLAY APPARATUS (71) Applicant: Panasonic Intellectual Property Management Co., Ltd., Osaka (JP)

(72) Inventor: Teruto Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/941,086

(22) Filed: Nov. 13, 2015

(65) Prior Publication Data
US 2016/0073072 A1    Mar. 10, 2016

Related U.S. Application Data (63) Continuation of application No. PCT/JP2015/001167, filed on Mar. 5, 2015.

(30) Foreign Application Priority Data

Mar. 18, 2014   (JP) ................................. 2014-054642

(51) Int. Cl.
*H04N 9/31*        (2006.01)
*G02B 26/08*       (2006.01)
(Continued)

(52) U.S. Cl.
CPC ....... *H04N 9/3155* (2013.01); *G02B 26/0833* (2013.01); *G03B 21/2013* (2013.01);
(Continued)

(58) Field of Classification Search
CPC .. H04N 9/3155; H04N 9/3164; H04N 9/3111; H04N 9/312; H04N 9/3123;
(Continued)

(56) References Cited

U.S. PATENT DOCUMENTS

2010/0079730 A1   4/2010   Shibasaki
2012/0038892 A1*  2/2012   Kurtz ................... H04N 9/3105
                                                           353/31
(Continued)

FOREIGN PATENT DOCUMENTS

CN     102144429 A    8/2011
CN     102455577 A    5/2012
(Continued)

OTHER PUBLICATIONS

International Search Report of PCT application No. PCT/JP2015/001167 dated May 26, 2015.
(Continued)

*Primary Examiner* — Cara E Rakowski
*Assistant Examiner* — Christopher A Lamb, II
(74) *Attorney, Agent, or Firm* — McDermott Will & Emery LLP (57) ABSTRACT

A projection image display apparatus of the present disclosure is provided with a plurality of light sources, a light combiner combining light rays emitted from the light sources, a light modulation element modulating light emitted from the light combiner, and a projection optical system projecting an image emitted from the light modulation element. The light sources are each controlled by pulse width modulation signals, and duty ratios of the pulse width modulation signals to the light sources differ from each other at least in a part of a set range of an amount of light combined by the light combiner.

6 Claims, 9 Drawing Sheets (51) Int. Cl.
    *G09G 3/00*     (2006.01)
    *G09G 3/34*     (2006.01)
    *G03B 21/20*    (2006.01)
(52) U.S. Cl.
    CPC ......... *G03B 21/2053* (2013.01); *G09G 3/002* (2013.01); *G09G 3/346* (2013.01); *G09G 3/3413* (2013.01); *H04N 9/3111* (2013.01); *H04N 9/3114* (2013.01); *H04N 9/3158* (2013.01); *H04N 9/3161* (2013.01); *H04N 9/3164* (2013.01); *G09G 2320/064* (2013.01)
(58) Field of Classification Search
    CPC ............... H04N 9/3158; H04N 9/3161; G03B 21/2013; G03B 21/2033; G03B 21/2053; G03B 21/204; G03B 21/206; G03B 21/2006
    See application file for complete search history.

(56)         References Cited

U.S. PATENT DOCUMENTS

| 2012/0099084 A1* | 4/2012 | Toyooka | G03B 21/14 353/85 |
| 2012/0242912 A1* | 9/2012 | Kitano  | H04N 9/3111 348/759 |
| 2013/0335642 A1* | 12/2013 | Fujioka | G03B 21/2033 348/744 |
| 2014/0085346 A1* | 3/2014 | Tsukagoshi | G09G 5/10 345/690 |
| 2014/0146092 A1 | 5/2014 | Toyooka | |
| 2015/0009477 A1 | 1/2015 | Toyooka et al. | |

FOREIGN PATENT DOCUMENTS

| JP | 2003-133087 | 5/2003 |
| JP | 2003-312051 | 11/2003 |
| JP | 2006-019060 | 1/2006 |
| JP | 2010-102300 | 5/2010 |
| JP | 2012-088546 | 5/2012 |
| JP | 2012-169147 | 9/2012 |
| JP | 2014-106420 | 6/2014 |
| WO | 2010/026518 A1 | 3/2010 |

OTHER PUBLICATIONS

English Translation of Chinese Search Report dated May 9, 2018 for the related Chinese Patent Application No. 201580001466.6.

* cited by examiner

PROJECTION IMAGE DISPLAY APPARATUS

BACKGROUND

Technical Field

The present disclosure relates to a projection image display apparatus such as a projector provided with a plurality of light sources.

Background Art

PTL 1 discloses a data projector apparatus provided with driving control means for driving light emitting diodes of RGB colors to emit light by a pulse width modulation system with a phase difference.

The apparatus is provided with a light source which divides an LED array into a plurality of groups and drives each of the LED array groups by pulse width modulation with a predetermined phase difference in synchronism with rotation of a color wheel. Accordingly, it is possible to achieve a data projector apparatus that controls a luminance of each of the RGB colors.

CITATION LIST

Patent Literature

PTL 1: Unexamined Japanese Patent Application No. 2010-102300

SUMMARY

Figure 7A:
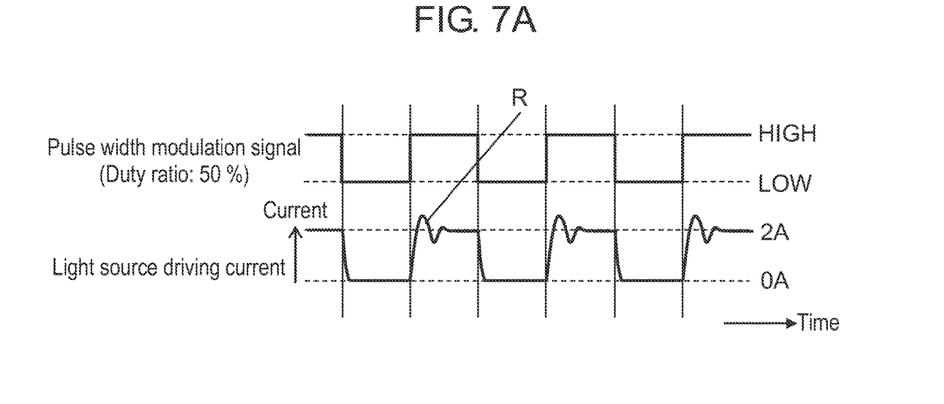
FIG. 7A is a diagram illustrating a relationship between a pulse width modulation signal (duty ratio: 50%) and a light source driving current in prior art.

When a driving current to a light source is controlled by a pulse width modulation signal, for example, in a light source driving current when a duty radio of the pulse width modulation signal is 50%, ringing R occurs when the light source driving current rises as illustrated in FIG. 7A. Thus, an average current becomes not 50%, but 53%, for example.

Figure 7B:
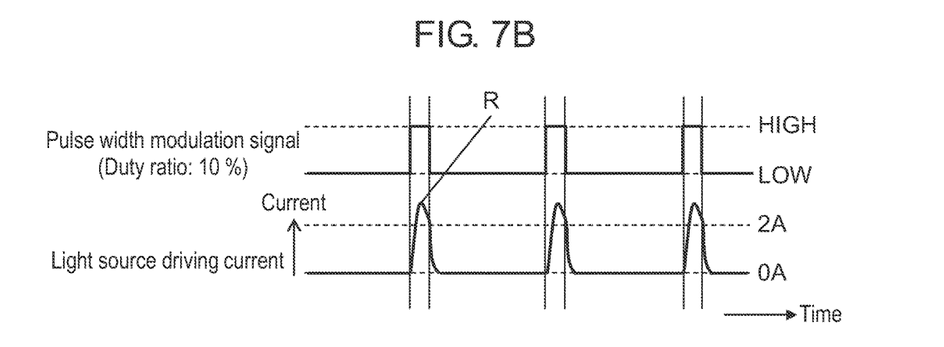
FIG. 7B is a diagram illustrating a relationship between a pulse width modulation signal (duty ratio: 10%) and a light source driving current in prior art.

Also in a light source driving current when the duty ratio of the pulse width modulation signal is 10%, ringing R occurs when the light source driving current rises as illustrated in FIG. 7B. Thus, an average current becomes not 10%, but 12%, for example.

Figure 7C:
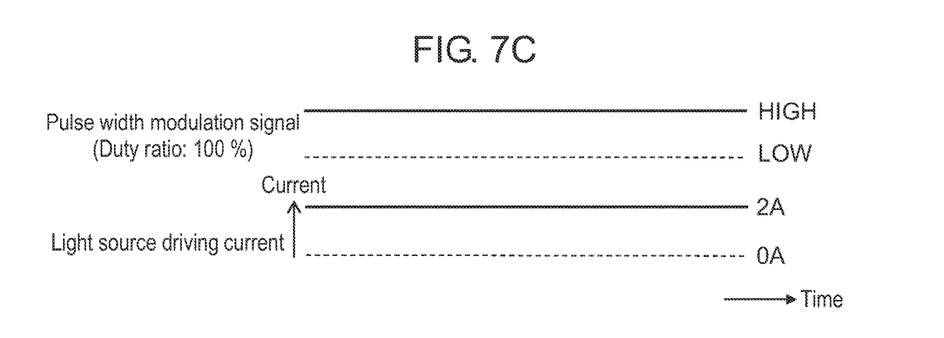
FIG. 7C is a diagram illustrating a relationship between a pulse width modulation signal (duty ratio: 100%) and a light source driving current in prior art.

FIG. 7C illustrates a light source driving current when the duty ratio of the pulse width modulation signal is 100%. In this case, no ringing occurs. Thus, an average current becomes 100%.

Figure 8A:
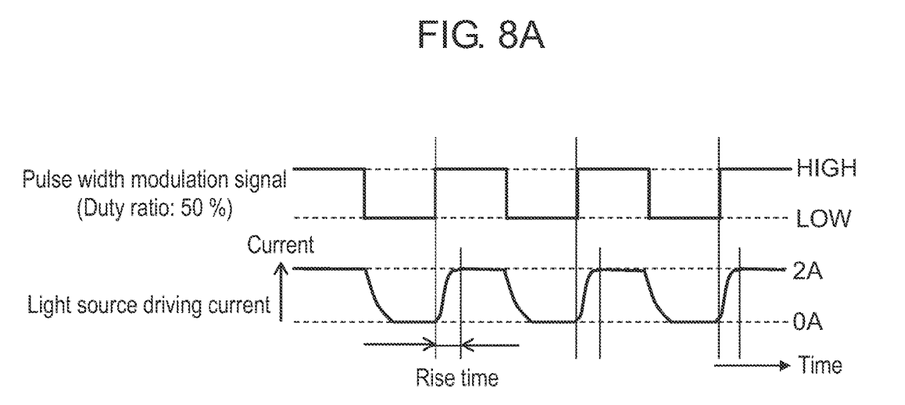
FIG. 8A is a diagram illustrating a relationship between a pulse width modulation signal (duty ratio: 50%) and a rise time of a light source driving current in prior art.
Figure 8B:
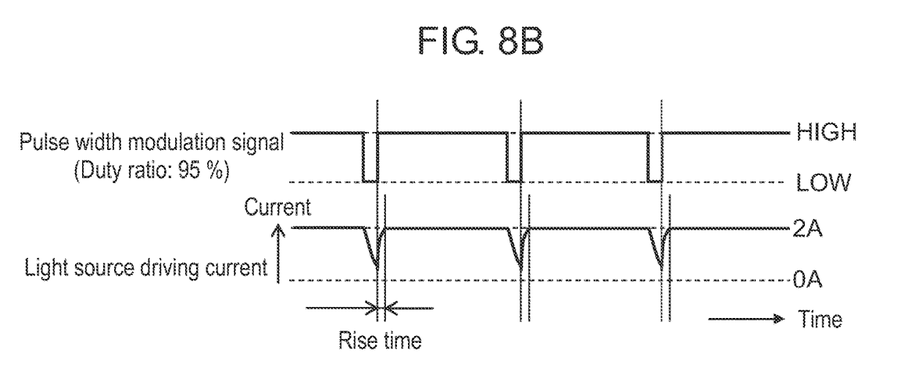
FIG. 8B is a diagram illustrating a relationship between a pulse width modulation signal (duty ratio: 95%) and a rise time of a light source driving current in prior art.

FIGS. 8A and 8B illustrate a relationship between the duty ratio of a pulse width modulation signal and a rise time of a light source driving current. FIG. 8A illustrates a light source driving current when the duty ratio of the pulse width modulation signal is 50%. In this case, since a field effect transistor (FET) operates from a saturation region in which the FET is completely off, a switching speed is reduced and the rise time of the light source driving current is increased. Accordingly, an average value of the light source driving current is lower than 50%.

FIG. 8B illustrates a driving current when the duty ratio of the pulse width modulation signal is 95%. In this case, since the FET operates from a state not completely off, only the switching speed is reduced to some extent. However, since the FET is not completely off, the average value of the light source driving current is more than 95%.

Figure 9:
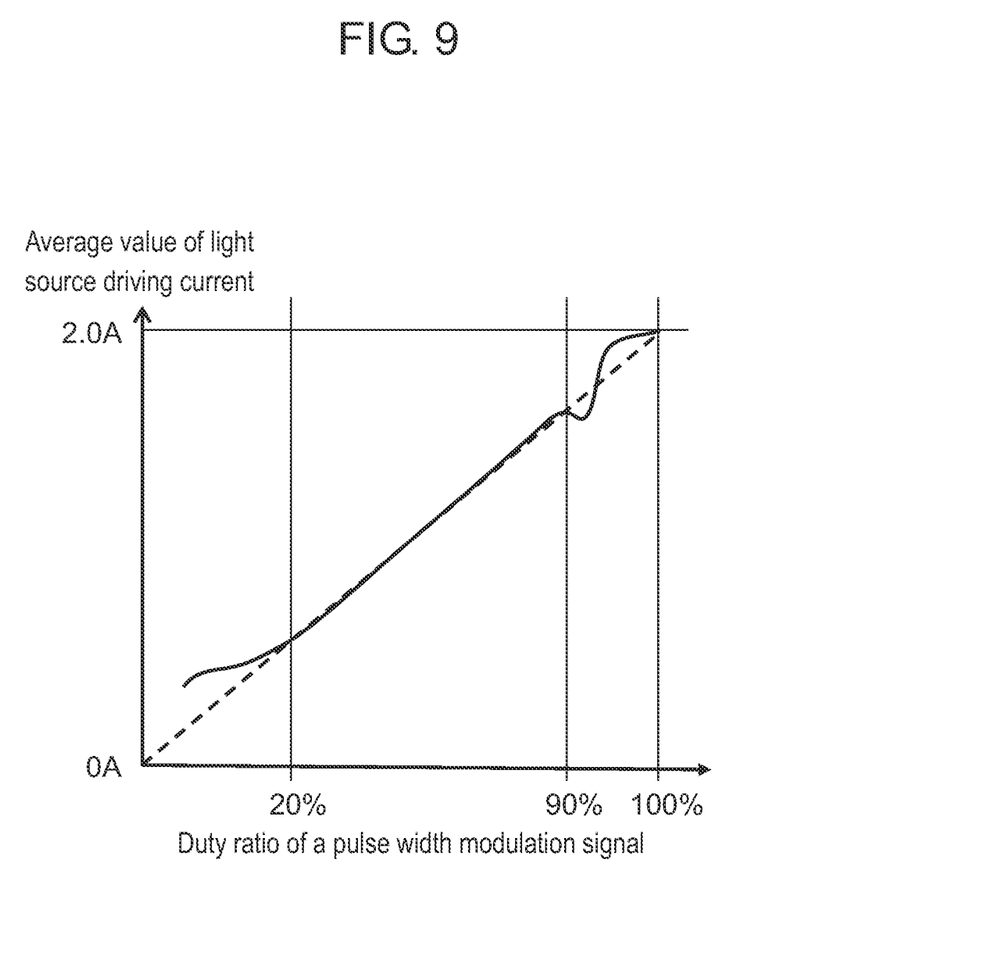
FIG. 9 is a schematic diagram illustrating a relationship between a duty ratio of pulse width modulation and an average value of a light source driving current in prior art.

In this manner, the relationship between the duty ratio of the pulse width modulation signal and the average value of the light source driving current is as illustrated in FIG. 9 due to a difference in switching time depending on the duty ratio and ringing R which occurs when the current rises.

A broken line in FIG. 9 indicates an ideal linear relationship between the duty ratio of the pulse width modulation signal and the average value of the light source driving current. A solid line in FIG. 9 indicates an actual average value of the light source driving current with respect to the duty ratio of the pulse width modulation signal. As illustrated in FIG. 9, in pulse width modulation control, a deviation from the ideal linear relationship is particularly large when the duty ratio of the pulse width modulation signal is in a range of 20% or less and 90% or more. This is because of that the light source driving current cannot generate an ideal rectangular wave equal to the pulse wave modulation signal due to ringing R as illustrated in FIGS. 7A and 7B and a switching time characteristic of a semiconductor switching element such as a FET as illustrated in FIGS. 8A and 8B.

Brightness of the light source is proportional to the average value of the light source driving current. Thus, when a proportional relationship of the average value of the light source driving current with respect to the duty ratio of the pulse width modulation signal is distorted, a proportional relationship between the duty ratio of the pulse width modulation signal and the brightness of the light source is also distorted. In particular, it is important to improve the proportional relationship with the brightness of the light source when the duty ratio of the pulse width modulation signal falls within a range from 90% to 100% inclusive in which an amount of light is large.

The present disclosure provides a projection image display apparatus in which a brightness of a light source is proportional to a duty ratio of a pulse width modulation signal.

A projection image display apparatus of the present disclosure is provided with a plurality of light sources, a light combiner combining light rays emitted from the light sources, a light modulation element modulating light emitted from the light combiner, and a projection optical system projecting an image emitted from the light modulation element. The light sources are each controlled by pulse width modulation signals, and duty ratios of the pulse width modulation signals to the light sources differ from each other at least in a part of a set range of an amount of light combined by the light combiner.

The projection image display apparatus in the present disclosure is effective to make the brightness of the light source proportional to the duty ratio of the pulse width modulation signal.

DESCRIPTION OF EMBODIMENTS

Hereinbelow, exemplary embodiments according to the present disclosure will be described with reference to the drawings. However, unnecessarily detailed description may be omitted. For example, detailed description of an already well-known matter and overlapping description of substantially the same configurations may be omitted in order to avoid the following description from becoming unnecessarily redundant and to make it easy for a person skilled in the art to understand the following description.

The accompanying drawings and the following description are provided so that a person skilled in the art can sufficiently understand the present disclosure. Therefore, the accompanying drawings and the follow description are not intended to limit the subject matter defined in the claims.

In the following exemplary embodiments, a projector will be described as an example of a projection image display apparatus. However, the exemplary embodiments are not limited to a projector, and the projection image display apparatus may be a television or another display apparatus.

First Exemplary Embodiment

Figure 1:
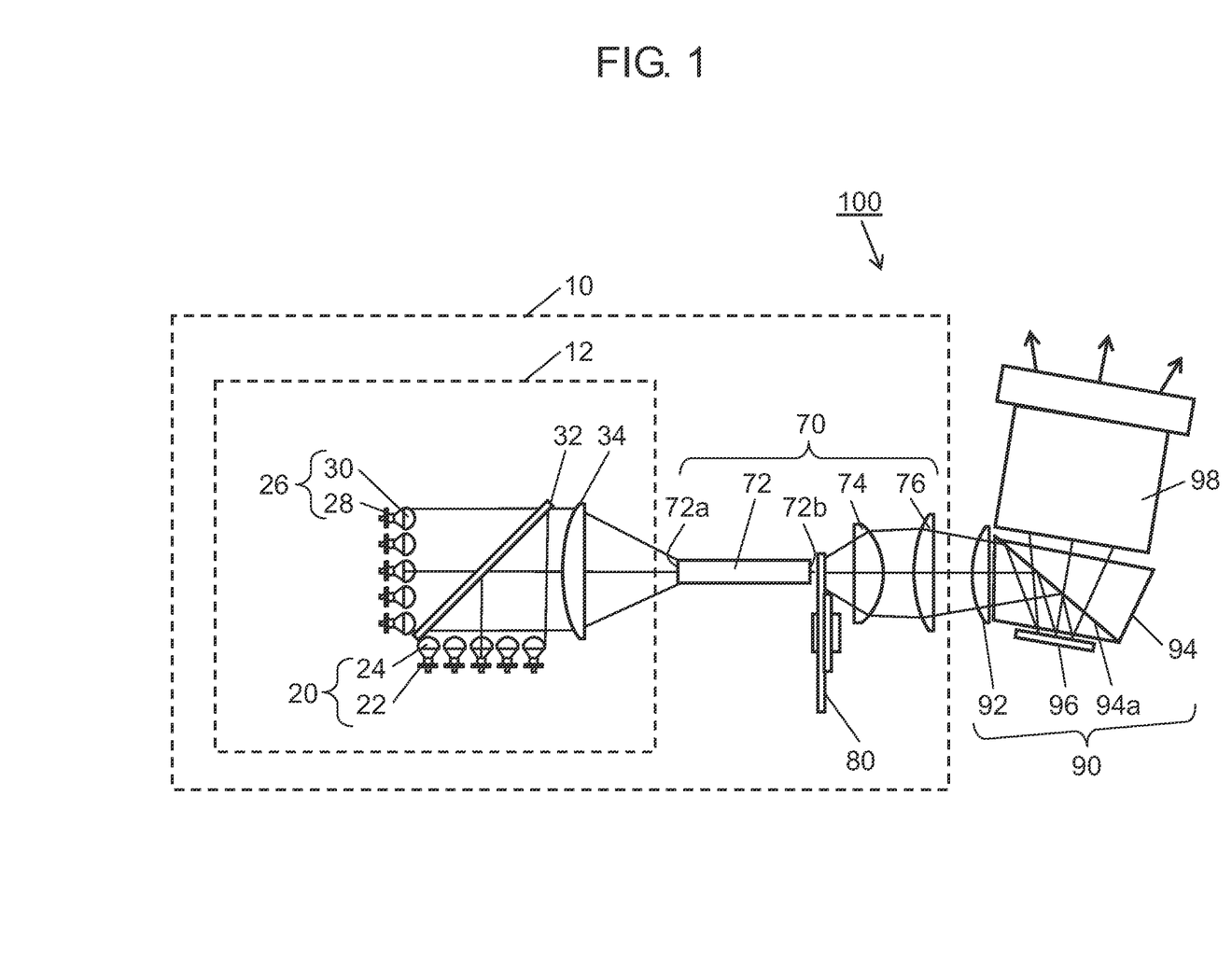
FIG. 1 is a diagram illustrating a configuration of a projection image display apparatus in a first exemplary embodiment.
Figure 2:
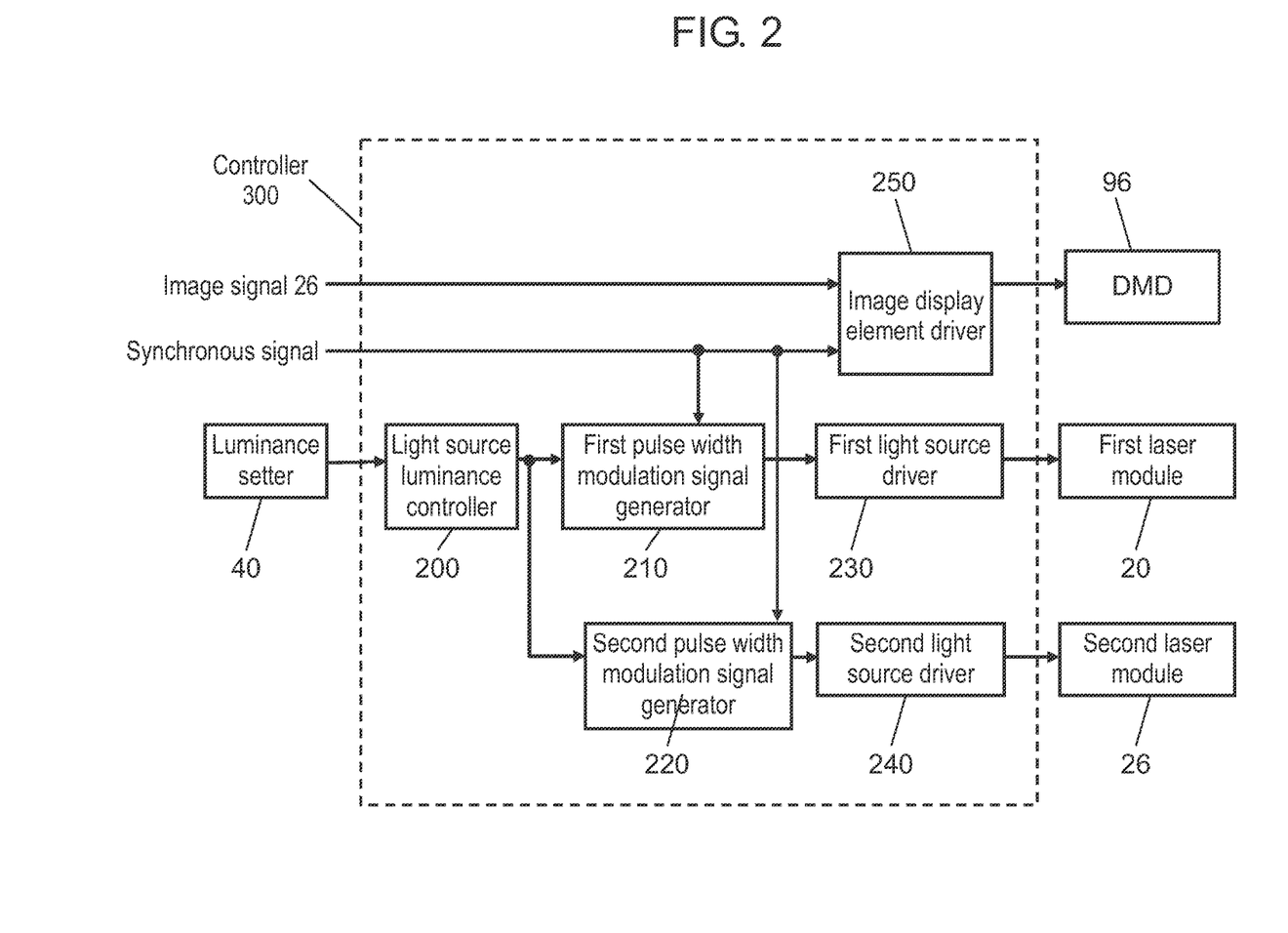
FIG. 2 is a diagram illustrating a configuration of a controller of the projection image display apparatus in the first exemplary embodiment.

Hereinbelow, a first exemplary embodiment will be described with reference to FIGS. 1 to 5.
[1-1. Configuration]
[1-1-1. Entire Configuration]
FIG. 1 is a diagram illustrating a configuration of projection image display apparatus 100. FIG. 2 is a diagram illustrating a configuration of controller 300 of projection image display apparatus 100. In this example, projection image display apparatus 100 is a projector.

Projection image display apparatus 100 is provided with illumination device 10, image generator 90, and projection lens 98 which projects image light generated by controller 300 illustrated in FIG. 2.

Illumination device 10 applies uniform and substantially paralleled light to image generator 90. Details of illumination device 10 and controller 300 will be described later.

Image generator 90 is provided with lens 92, total reflection prism 94, and one digital mirror device (DMD) 96. Lens 92 has a function of forming an image of light from an emission face of rod integrator 72 on DMD 96.

Light that has entered total reflection prism 94 through lens 92 is reflected by face 94a and guided to DMD 96. DMD 96 is controlled by controller 300 in correspondence with timing of light of each color entering each of a plurality of mirrors and in accordance with an image signal input to DMD 96.

Light (image light) that has been modulated and emitted by DMD 96 is guided to projection lens 98 through total reflection prisma 94. For example, in the present exemplary embodiment, a DMD having a diagonal size of 0.67 inches is used as DMD 96. DMD 96 is an example of a light modulation element.

Projection lens 98 projects temporally combined image light on a screen (not illustrated) located outside the apparatus. An F number of projection lens 98 is, for example, 1.7. Projection lens 98 is an example of a projection optical system.
[1-1-2. Configuration of Illumination Device]
As illustrated in FIG. 1, illumination device 10 is provided with light source device 12, light guide optical system 70 which guides light emitted from light source device 12 to image generator 90, and filter wheel 80.

First laser module 20 is provided with first semiconductor laser element 22 which emits blue laser light having a wavelength of 450 nm and first lens 24 disposed on first semiconductor laser element 22. Second laser module 26 is provided with second semiconductor laser element 28 which emits blue laser light having a wavelength of 450 nm and second lens 30 disposed on second semiconductor laser element 28. First laser modules 20 and second laser modules 26 are respectively arranged in a matrix of 5×5.

Each of first lens 24 and second lens 30 has a function of converging light emitted with a spread angle from the semiconductor laser element into a parallel light pencil. Each of first laser module 20 and second laser module 26 is an example of a light source.

Light rays emitted from the respective laser modules are spatially combined by mirror 32. The semiconductor laser elements of the laser modules are arranged at equal intervals. A position of each of the laser modules is adjusted so that light emitted from first laser modules 20 and light emitted from second laser modules 26 enter mirror 32 at different positions.

In mirror 32, anti-reflection (AR) coating having high transmissivity to laser light is applied to regions that receive light emitted from first laser modules 20, and mirror coating having high reflectivity to laser light is applied to regions that receive light emitted from second laser modules 26.

Laser light combined by mirror 32 is converted to light including yellow color and blue color by a phosphor wheel (not illustrated) coated with a phosphor that emits yellow light. The converted light is collected by lens 34. The light collected by lens 34 forms light to be emitted from light source device 12.

The light emitted from light source device 12 enters rod integrator 72. Rod integrator 72 is provided with entrance face 72a and emission face 72b. The light that has entered entrance face 72a of rod integrator 72 from light source device 12 is further equalized in illuminance inside rod integrator 72, is then emitted from emission face 72b to pass through filter wheel 80.

Filter wheel 80 has a disc-like shape. Filter wheel 80 has, on a disc face, a red segment, a green segment, and a blue segment which are divided at every predetermined angle. The red segment has a red color filter. The green segment has a green color filter. The blue segment has a blue color filter.

The red color filter transmits red light having a wavelength of approximately 580 nm to 700 nm among the light emitted from light source device 12. The green color filter transmits green light having a wavelength of approximately 480 nm to 580 nm among the light emitted from light source device 12. The blue color filter transmits blue light having a wavelength of approximately 400 nm to 480 nm among the light emitted from light source device 12.

Light emitted from filter wheel 80 is relayed to lens 74 and lens 76 and enters image generator 90 as output light from illumination device 10. As described above, illumination device 10 is provided with the optical components such as various lenses and mirrors.

[1-1-3. Configuration of Controller]

As illustrated in FIG. 2, controller 300 includes light source luminance controller 200, first pulse width modulation signal generator 210 and second pulse width modulation signal generator 220, first light source driver 230 and second light source driver 240, and image display element driver 250.

Light source luminance controller 200 controls first pulse width modulation signal generator 210 and second pulse width modulation signal generator 220 in accordance with a light amount target value (target luminance value) which is set by a user using luminance setter 40.

First pulse width modulation signal generator 210 generates a switching pulse signal for turning on/off first light source driver 230. Second pulse width modulation signal generator 220 generates a switching pulse signal for turning on/off second light source driver 240. First light source driver 230 drives first laser module 20 in accordance with a pulse signal generated by first pulse width modulation signal generator 210. Second light source driver 240 drives second laser module 26 in accordance with a pulse signal generated by second pulse width modulation signal generator 220. Image display element driver 250 drives DMD 96 by an image signal and a synchronous signal which are input to image display element driver 250. Luminance adjustment in an image may be performed not only by a user, but also by, for example, correction of a change in luminance corresponding to a change in temperature of the light source, correction of a reduction in luminance caused by a deterioration with the lapse of time of the light source, automatic luminance control corresponding to a scene of an input image signal, or the like.

[1-2. Operation]

Hereinbelow, an operation of projection image display apparatus 100 configured in the above manner will be described.

In projection image display apparatus 100, illumination device 10 outputs light rays of three colors, which are specifically, red light, green light, and blue light so as to be switched in a time-division manner. Image generator 90 generates image light from the light emitted from illumination device 10. Projection lens 98 projects the generated image light on the screen.

Controller 300 synchronously controls DMD 96 of image generator 90 and filter wheel 80 of illumination device 10. Controller 300 controls DMD 96 so as to generate image light corresponding to light of each color in accordance with an image signal input to controller 300. Accordingly, image light of each color is projected on the screen in a time-division manner. The user visually recognizes an image by continuously looking at image light projected on the screen.

When a ratio of a light amount target value which is set by the user using luminance setter 40 to a rated luminance is denoted by d0, a duty ratio between on and off of first pulse width modulation signal generator 210 is denoted by d1, and a duty ratio between on and off of second pulse width modulation signal generator 220 is denoted by d2, light source luminance controller 200 calculates d1 and d2 by Expressions (1) and (2).

$$d1=d0\times 90\%,\ d2=d0\times 110\%,\ \text{when}\ d0<(1000/11)\% \quad \text{Expression (1)}$$

$$d1=d0\times 2-100\%,\ d2=100\%,\ \text{when}\ d0\geq(1000/11)\% \quad \text{Expression (2)}$$

Expressions (1) and (2) mean that an average of d1 and d2 becomes d0, that is, a luminance ratio obtained by averaging a ratio of first laser module 20 to the rated luminance and a ratio of second laser module 26 to the rated luminance becomes ratio d0 of the light amount target value to the rated luminance.

Figure 3:
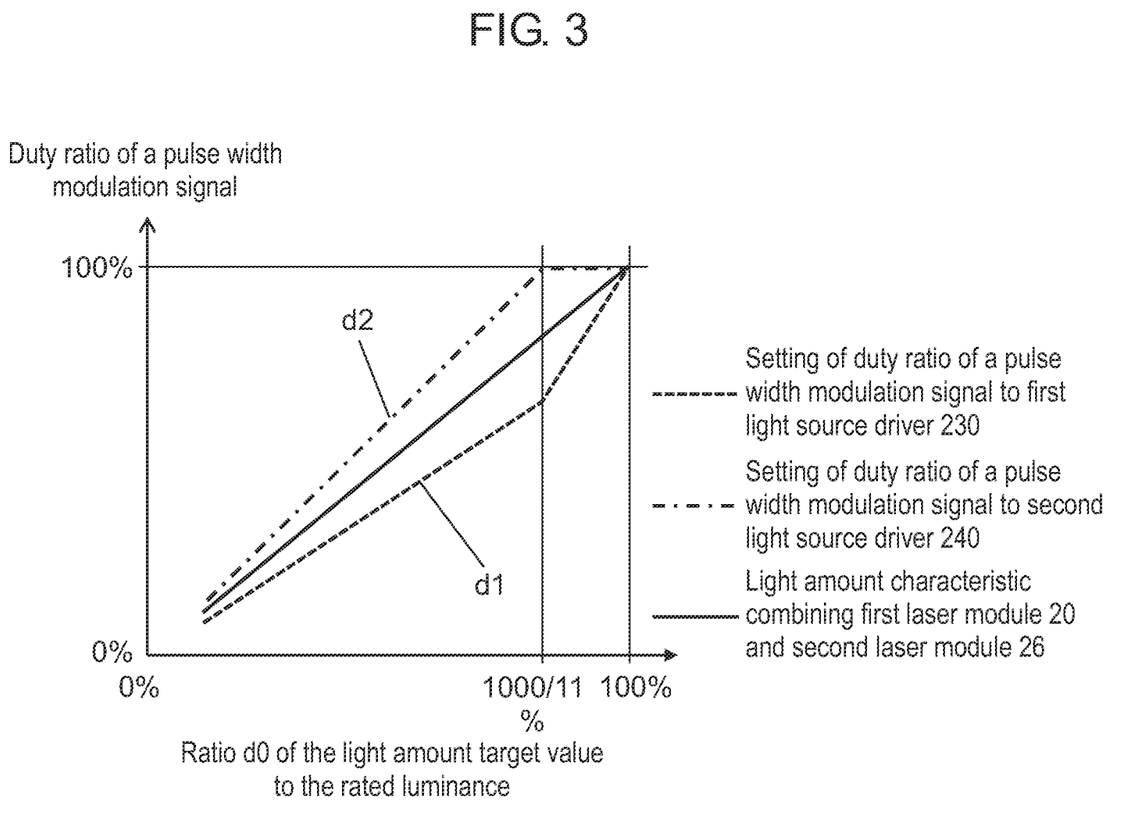
FIG. 3 is a schematic diagram illustrating a relationship between a ratio of a light amount target value to a rated luminance and a duty ratio of a pulse width modulation signal in the first exemplary embodiment.

FIG. 3 is a graph illustrating this characteristic. FIG. 3 illustrates a relationship between ratio d0 of the light amount target value to the rated luminance and the duty ratio of the pulse width modulation signal. A broken line in FIG. 3 indicates a setting of duty ratio d1 of a pulse width modulation signal to first light source driver 230. A dot-dash line in FIG. 3 indicates a setting of duty ratio d2 of a pulse width modulation signal to second light source driver 240. In this manner, in the present exemplary embodiment, different duty ratios of pulse width modulation signals are set to the respective light source drivers which drive the respective laser modules. Driving the laser modules with the different duty ratios averages combined light rays of the laser modules and relaxes characteristics of a duty ratio with poor linearity in light source device 12. A solid line in FIG. 3 schematically illustrates a light amount characteristic combining first laser module 20 and second laser module 26, which shows a characteristic of an improved duty ratio with excellent linearity.

Figure 4A:
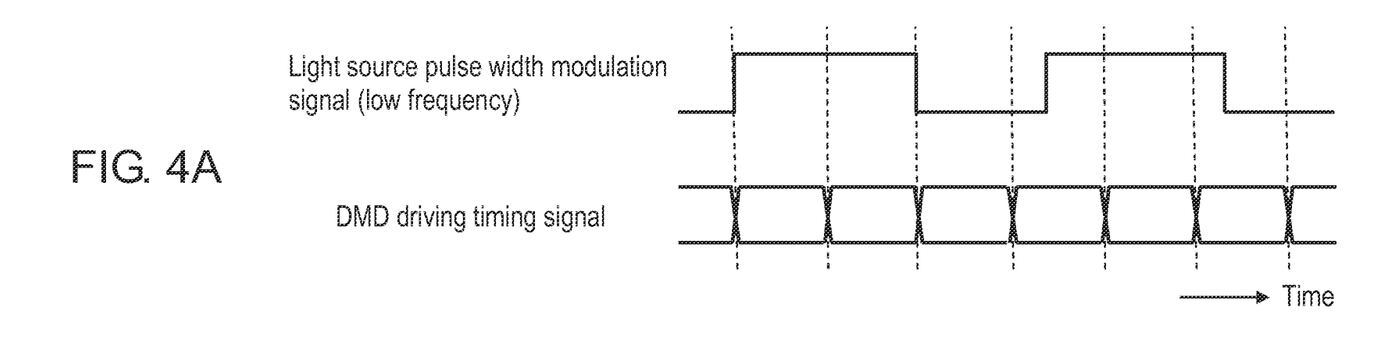
FIG. 4A is a schematic diagram illustrating a relationship in frequency between a combined light source pulse width modulation signal (low frequency) and a DMD driving timing signal in the first exemplary embodiment.
Figure 4B:
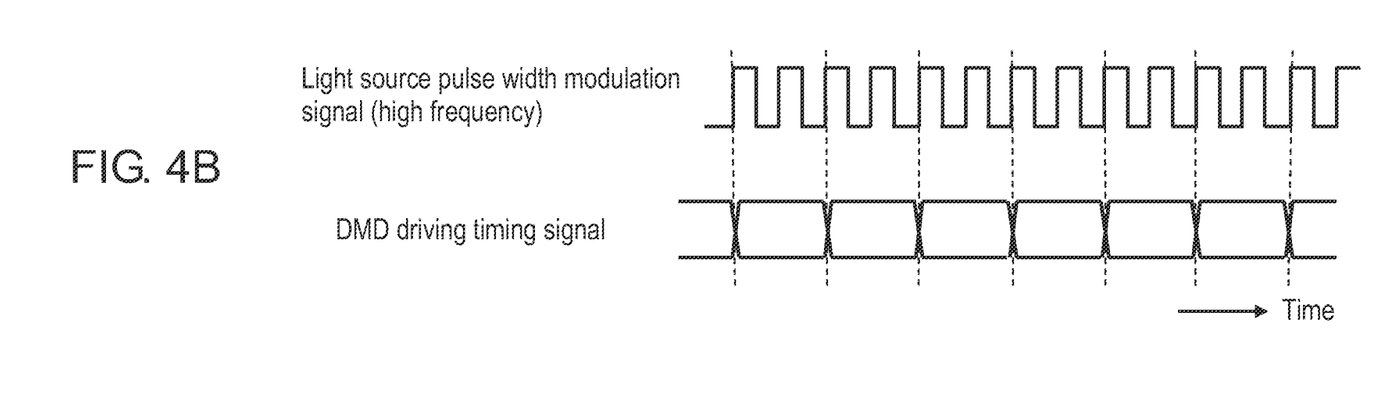
FIG. 4B is a schematic diagram illustrating a relationship in frequency between a combined light source pulse width modulation signal (high frequency) and a DMD driving timing signal in the first exemplary embodiment.

FIGS. 4A and 4B are schematic diagrams each illustrating a relationship in frequency between a combined light source pulse width modulation signal and a DMD driving timing signal. When a frequency of the light source pulse width modulation signal is lower than a frequency of the DMD driving timing signal as illustrated in FIG. 4A, flicker caused by interference between the light source pulse width modulation signal and the DMD driving timing signal occurs. In order to reduce the flicker, it is necessary to make the frequency of the light source pulse width modulation signal higher than the frequency of the DMD driving timing signal as illustrated in FIG. 4B.

Figure 5:
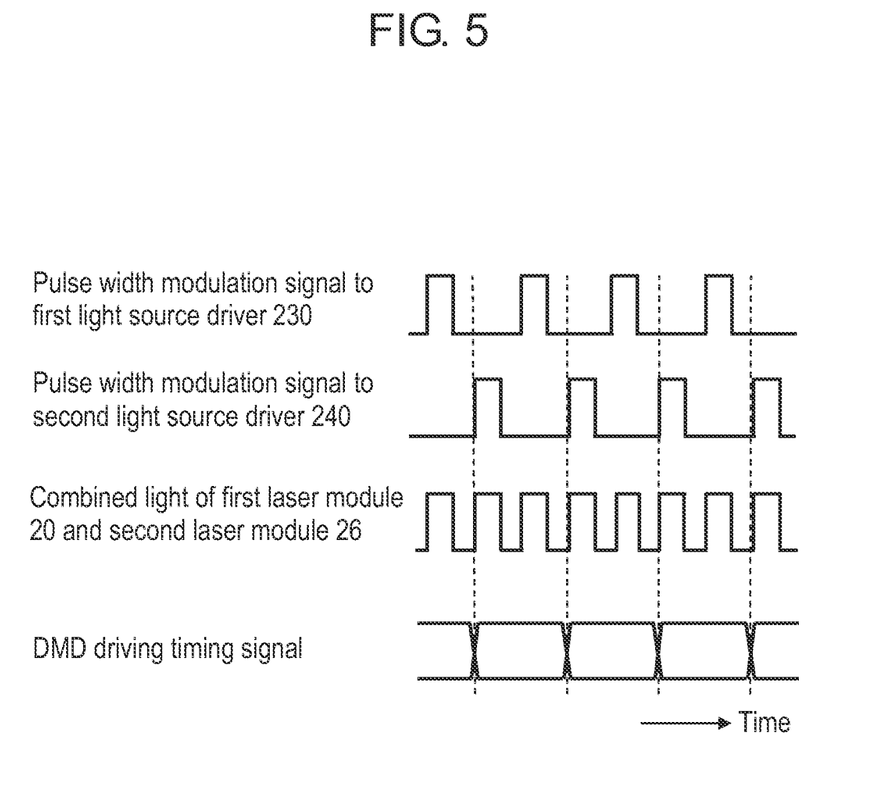
FIG. 5 is a schematic diagram illustrating a relationship in frequency between a light source pulse width modulation signal and a DMD driving timing signal in the first exemplary embodiment.

FIG. 5 illustrates a pulse of combined light obtained based on first laser module 20 and second laser module 26 when a pulse width modulation signal to first light source driver 230 and a pulse width modulation signal to second light source driver 240 are out of phase by 180°.

When a pulse width modulation signal generated by first pulse width modulation signal generator 210 and a pulse width modulation signal generated by second pulse width modulation signal generator 220 are out of phase by 180° in first light source driver 230 and second light source driver 240, the frequency of the combined light obtained based on first laser module 20 and second laser module 26 becomes twice the frequency of the original pulse width modulation signal.

This means that, when a switching frequency of the combined light with respect to the frequency of the DMD driving timing signal is made constant, the frequency of the pulse width modulation signal for each of the light source drivers becomes half. Reducing the frequency of a pulse width modulation signal leads to an improvement in ringing R of a light source driving current and in a switching time characteristic as illustrated in FIGS. 7A to 7C, 8A and 8B. Accordingly, a proportional relationship between the duty ratio of the pulse width modulation signal and the luminance of the light source is improved.

[1-3. Effect]

In this manner, the proportional relationship between the duty ratio of the pulse width modulation signal and the luminance of the light source is improved by providing two drivers for the light source and setting different duty ratios and different phases of the pulse width modulation signals between the drivers.

Other Exemplary Embodiments

The first exemplary embodiment has been described as an example of the technique disclosed in the present application. However, the technique in the present disclosure is not limited to the first exemplary embodiment, and also applicable to embodiments in which modifications, replacements, additions, and omissions are made. The elements described in the first exemplary embodiment may be combined to form a new embodiment. Hereinbelow, other exemplary embodiments will be described as examples.

Figure 6:
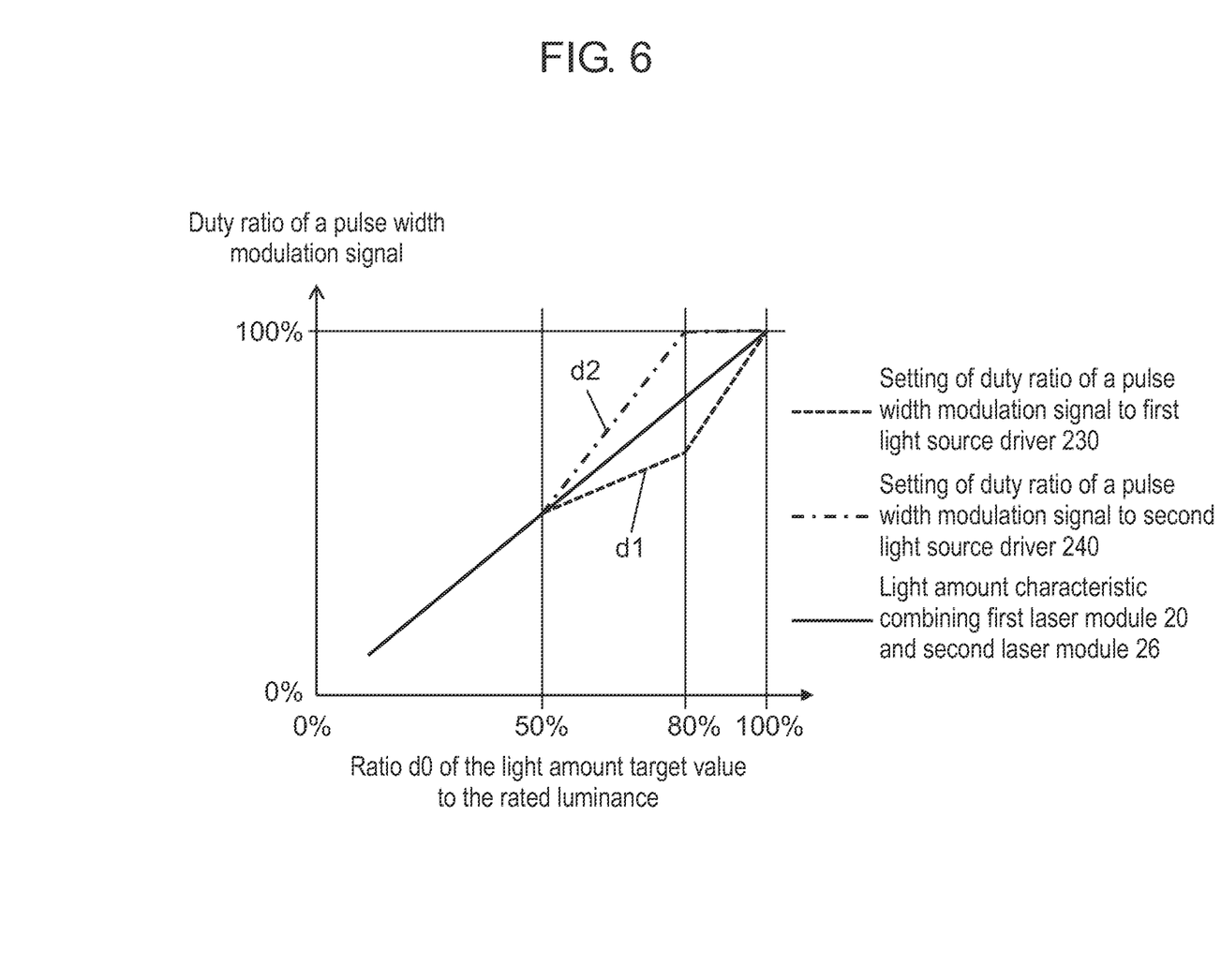
FIG. 6 is a schematic diagram illustrating a relationship between a ratio of a light amount target value to a rated luminance and a duty ratio of a pulse width modulation signal in another exemplary embodiment.

In the above first exemplary embodiment, as illustrated in FIG. 3 and Expressions (1) and (2), control for duty radio d1 to first light source driver 230 and duty ratio d2 to second light source driver 240 are switched at a point where ratio d0 of the light amount target value to the rated luminance is approximately 90%. Alternatively, as illustrated in FIG. 6, for example, control for the duty ratios may be switched at a point where ratio d0 of the light amount target value to the rated luminance is approximately 80%.

In the above first exemplary embodiment, as illustrated in FIG. 3 and Expressions (1) and (2), duty ratio d1 to first light source driver 230 and duty ratio d2 to second light source driver 240 are set to different values throughout an entire range of radio d0 of the light amount target value to the rated luminance. Alternatively, as illustrated in FIG. 6, for example, duty ratio d1 to first light source driver 230 and duty ratio d2 to second light source driver 240 may be set to different values in a range in which ratio d0 of the light amount target value to the rated luminance is 50% or more. In this manner, it is necessary to control the light source drivers so as to have different duty ratios at least in a part of a set range of the amount of light obtained by combining light rays emitted from the respective laser modules. In particular, as illustrated in FIG. 9, a deviation in a proportional relationship between a duty ratio of a pulse width modulation signal and an average value of a light source driving current is large in a range from 90% to 100% inclusive. Thus, it is necessary to set duty ratio d1 to first light source driver 230 and duty ratio d2 to second light source driver 240 to different values at least in this range. This setting improves the proportional relationship between ratio d0 of the light amount target value to the rated luminance and an amount of light actually emitted from light source device 12.

In the above first exemplary embodiment, DMD 96 has been described as an example of the light modulation element. The light modulation element is only required to be an element that modulates light emitted from illumination device 10 and outputs image light. Thus, the light modulation element is not limited to DMD 96. For example, the light modulation element may include a reflective liquid crystal panel and a transmissive liquid crystal panel.

In the above first exemplary embodiment, there has been described, as an example, a configuration that uses one DMD 96 by dividing light rays of three colors in a time-division manner. Alternatively, a configuration that uses three DMDs by separating light of one color, which is white light into red, green, and blue by a prism may be used.

In the above first exemplary embodiment, two lines of light source drivers and light source units are provided. Alternatively, three or more lines of light source drivers and light source units may be used.

In the above first exemplary embodiment, there has been described, as an example, the laser modules arranged in a matrix of 5×5, in which each laser module includes the semiconductor laser element. However, a number and an arrangement of the semiconductor laser elements are not limited to this configuration. The configuration of the laser module may be set in accordance with a light intensity per single semiconductor laser element, desired output for light source device 12, and the like.

A wavelength of laser light is not limited to 450 nm. For example, a violet semiconductor laser element that emits light of 405 nm or a semiconductor laser element that emits ultraviolet light of 400 nm or less may be used.

In the above first exemplary embodiment, there has been described, as an example, a configuration in which a phosphor is excited by blue laser light to emit light having a main wavelength of yellow color. Alternatively, a phosphor that emits light having a main wavelength of red or green color may be used.

In the above first exemplary embodiment, the duty ratio of pulse width modulation signals to twenty five first laser modules 20 and the duty ratio of the pulse width modulation signals to twenty five second laser modules 26 are made to differ from each other. Alternatively, a duty ratio of pulse width modulation signals to any twenty five laser modules selected from first laser modules 20 and second laser modules 26 and a duty ratio of pulse width modulation signals to the remaining twenty five laser modules may be made to differ from each other. Further, duty ratios of pulse modulation signals to all the fifty laser modules may be made to differ from each other.

In the above exemplary embodiment, light rays emitted from the respective laser modules are spatially combined by mirror 32. However, the light combiner is not limited to mirror 32. For example, light rays may be emitted in the same direction from the respective laser modules and combined by rod integrator 72 without using mirror 32.

In the above first exemplary embodiment, the semiconductor lasers are used as light sources. Alternatively, other light sources such as an LED and a light source lamp may be used.

INDUSTRIAL APPLICABILITY

The present technique is applicable to a projection image display apparatus provided with a plurality of light sources. Specifically, the present technique is applicable to a television and the like, in addition to a projector.

What is claimed is:

1. A projection image display apparatus comprising:
a plurality of light sources including a first light source and a second light source;
a light combiner combining light rays emitted from the plurality of light sources into a combined light;
a light modulation element modulating the combined light; and
a projection optical system projecting an image emitted from the light modulation element,
wherein the plurality of light sources are each controlled by pulse width modulation signals, each of which contains a plurality of pulses, and duty ratios of the plurality of pulses of the pulse width modulation signals differ from each other,
the duty ratios of the plurality of pulses of the pulse width modulation signals to the light sources are set so that a total luminance value of the light sources, which is determined based on the duty ratios of the plurality of pulses of the pulse width modulation signals to the light sources, becomes a target luminance value of an image projected from the projection optical system,
the duty ratios of the plurality of pulses of the pulse width modulation signals to the light sources increase as the target luminance value increases,
when the target luminance value is less than a predetermined value, which is less than 100%, a duty ratio of the first light source increases faster than a duty ratio of the second light source increases, as the target luminance value increases, and
when the target luminance value is equal to or greater than the predetermined value, the duty ratio of the first light source increases slower than the duty ratio of the second light source increases, as the target luminance value increases.

2. The projection image display apparatus according to claim 1, wherein the pulse width modulation signals have different phases from each other with respect to the light sources.

3. The projection image display apparatus according to claim 2, wherein the pulse width modulation signals consists of two signals having 180 degrees out of phase.

4. The projection image display apparatus according to claim 1, wherein at least one of the duty ratios of the plurality of pulses of the pulse width modulation signals to the light sources increases as the target luminance value increases from 0% to 100%.

5. The projection image display apparatus according to claim 1, wherein the plurality of light sources each controlled by pulse width modulation signals of which duty ratios differ from each other are combined by the light combiner and modulated by the light modulation element to same color.

6. The projection image display apparatus according to claim 1, wherein the light modulation element is driven by a driving timing signal, and a frequency of the combined light is higher than a frequency of the driving timing signal.

* * * * *